United States Patent [19]

Yanagida et al.

[11] Patent Number: 4,530,015
[45] Date of Patent: Jul. 16, 1985

[54] CAMERA WITH INTEGRAL MAGNETIC RECORDER

[75] Inventors: Seiichi Yanagida, Hiratsuka; Naoki Kobayashi, Iwatsuki, both of Japan

[73] Assignees: Tokyo Shibaura Denki Kabushiki Kaisha, Kawasaki; Fuji Photo Film Co., Ltd., Tokyo, both of Japan

[21] Appl. No.: 482,408

[22] Filed: Apr. 6, 1983

[30] Foreign Application Priority Data

Apr. 9, 1982 [JP] Japan .................... 57-59016

[51] Int. Cl.³ .................................... H04N 5/782
[52] U.S. Cl. ........................... 360/33.1; 358/335; 358/906
[58] Field of Search ............ 358/335, 906, 185, 209, 358/229; 360/33.1

[56] References Cited

U.S. PATENT DOCUMENTS 4,442,462  4/1984  Kimura ..................... 358/906

FOREIGN PATENT DOCUMENTS 2461586  3/1978  Fed. Rep. of Germany .
140507  10/1979  Japan ....................... 358/906

OTHER PUBLICATIONS

Funkschau 15/1981, Internationales Fernseh-Symposium, "Die Stars hieben Hawkeye und Betacam", pp. 72–75.

Primary Examiner—Robert L. Richardson
Attorney, Agent, or Firm—Oblon, Fisher, Spivak, McClelland & Maier

[57] ABSTRACT

A video camera with an integral VTR is disclosed, which has a support structure supporting a camera section and a VTR. The support structure has three base plates made integrally with one another and extending perpendicularly to one another. The first base plate is secured to a transversely central portion of the rear surface of the second base plate. The first and second base plates are secured to the top surface of the third base plate. The VTR is mounted on the first base plate. A mount is secured by bars to the front surface of the second base plate, in such a way that it is spaced at a suitable distance therefrom. An image pickup lens system and an image sensor for converting light into an electrical signal are mounted on the mount. A grip is secured to the underside of a portion of the third base plate, where the first and second base plates cross each other.

8 Claims, 3 Drawing Figures

CAMERA WITH INTEGRAL MAGNETIC RECORDER

BACKGROUND OF THE INVENTION

This invention relates to a camera with an integral magnetic recorder, in which an image pickup optical system and a magnetic recorder are integrally assembled.

A prior art video camera apparatus comprises a video camera, which includes an image pickup lens system and a viewfinder and is supported by a grip, and a video tape recorder (VTR) which includes a magnetic recorder section and is adapted in such a way that it may be slung over ones shoulder. In this apparatus, however, the video camera and VTR are constructed separately. Therefore, the maneuverability when picking up images is rather inferior. There have been attempts to assemble the VTR in the video camera is such a way as to provide a single unit which has all of the required functions. This, however, has not yet been in practical use. In the prior art video camera, the individual components, such as lens system, viewfinder and grip are supported in a housing. To mount the magnetic recorder section of the VTR in the housing, as well, the housing wall would need to have an increased thickness to ensure its mechanical strength. In this case, the weight of the video camera would need to be increased considerably and the size thereof would also need to be increased.

SUMMARY OF THE INVENTION

One object of the present invention is to provide a camera with an integral magnetic recorder of reduced size and weight, which comprises a support structure including three substantially perpendicular integral support members disposed in the housing, an image pickup optical system, a magnetic recorder section and a grip supported on the support structure.

According to the invention, a camera with an integral magnetic recorder is provided for recording images of objects on a magnetic recording medium which comprises an image pickup optical system for converting images of the objects into electrical signals, recording means for recording said electrical signals on the magnetic recording medium, holder means for holding the camera and a support structure for supporting the image pickup optical system and recording means. The support structure is constituted by a first, second and third support member, these support members being secured to one another, in such a way that they cross one another. The recording means is mounted on the first support member, the image pickup optical system is mounted on the second support member and the holder means is mounted on the third support member.

The support structure, which consists of first, second and third support members secured to one another in such a way that they extend perpendicularly to one another and mutually reinforce their mechanical strengths, provides sufficient mechanical strength. Thus, it can support the camera device optical system and recording means with sufficient strength, even though it is light in weight. Thus, recording means such as a VTR can be assembled in the camera without the need of substantially increasing the camera's weight.

DETAILED DESCRIPTION OF THE PREFERRED EMBODIMENTS

Figure 1:
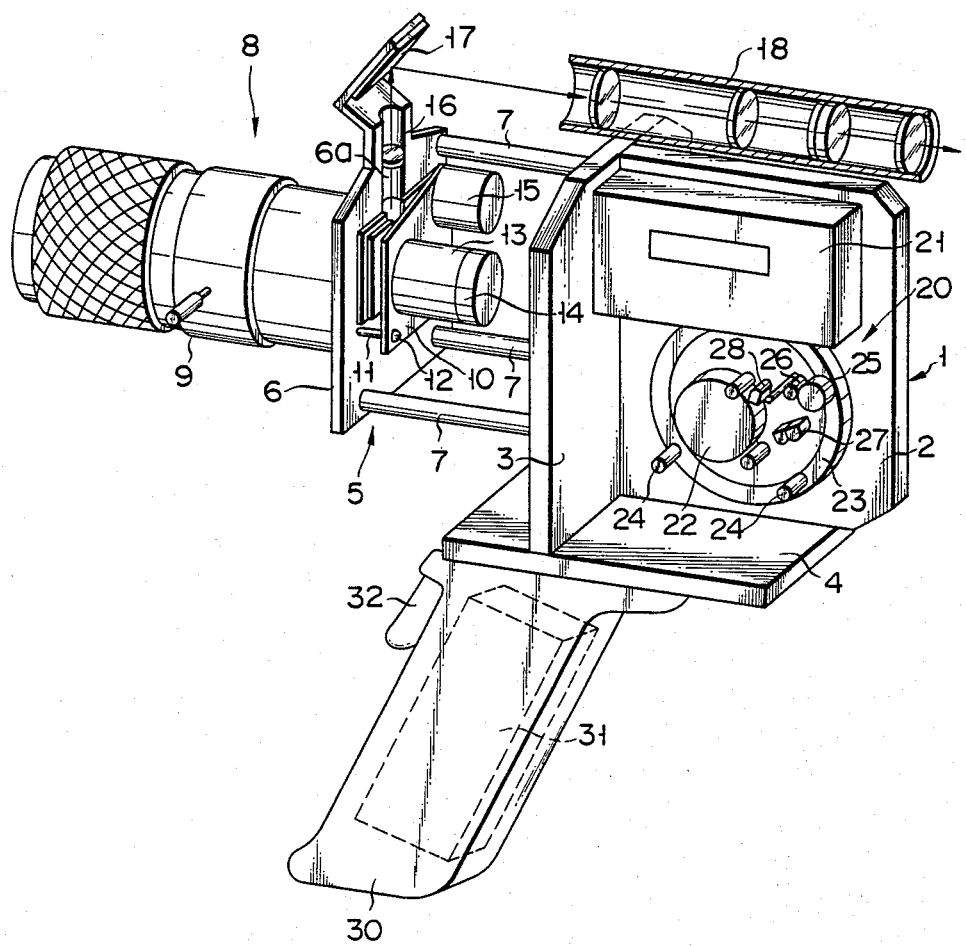
FIG. 1 is a perspective view showing the internal construction of a video camera with VTR, embodying the invention.

FIG. 1 schematically shows a video camera with an integral VTR, having its housing removed. The video camera comprises a support structure 1 and a lens system support 5, these being accommodated in a housing (not shown). The support structure 1 has three substantially rectangular base plates 2, 3 and 4. The first base plate 2 has its front edge secured to the central portion of the rear surface of the second base plate 3, so that these base plates extending perpendicularly to each other. Base plates 2 and 3 have their lower edges secured to the top surface of the third base plate 4. Base plates 2 to 4 are thus made integral, in such a way that they are substantially perpendicular to one another.

The lens system support 5 is secured to the front surface of the base plate 3. The lens system support 5 includes a mount 6, to which an image pickup lens system 9 of an image pickup optical system or a camera section 8 is secured, and a plurality of bars 7, to which the mount 6 and base plate 3 are connected by bolts (not shown), so as to be spaced at a suitable distance. The mount 6 has a central aperture or opening (not shown) through which light can pass. The image pickup lens system 9 is mounted on the central portion of the front surface of the mount 6. A support member 10 is secured to the central portion of the rear surface of the mount 6. It is secured by bolts 12 to the mount 6 via spacers 11 which space the member 10 a suitable distance from the mount 6. A master optical system unit 13 is mounted on the rear surface of the support member 10. This unit 13 accommodates a plurality of lenses, with the axes thereof being aligned to the axis of the image pickup lens system 9. An image sensor 14, e.g., a CCD (charge coupled device) is provided on the rear end of the unit 13. Light led through the lens system 9 and unit 13 is detected by the image sensor 14. A light beam splitter (not shown) is provided on the light path between the mount 6 and support member 10. This beam splitter polarizes part of the light upwardly, which has passed through the lens system 9. The rest of the light is directed to unit 13. A diaphragm (not shown) is provided on the light path between the light beam splitter and support member 10. A light quantity control unit 15 is also mounted on the rear surface of the support member 10. This unit adjusts the aperture of the diaphragm to control the quantity of light being incident on the unit 13. A light image is thus focused, through the lens system 9 and unit 13, onto the image sensor 14. The image sensor 14 converts the incident light image into a video signal which is supplied to a VTR 20.

The mount 6 is formed on its rear side with a groove 6a, which extends upwardly from a position corresponding to the light beam splitter. A lens 16 is received in the groove 6a in such a way that its optical axis extends in parallel to the groove 6a. A total reflection mirror 17 is provided just above the lens 16 and reflects light therefrom to the rear. Light reflected by the total reflection mirror 17 is led through a lens system 18 provided above the support structure 1 to a viewfinder (not shown). The viewfinder and lens system 18 may be mounted in the housing of the video camera.

The VTR 20 is secured to the base plate 2. A cassette housing (not shown) which accommodates a cassette half 21 is secured to an upper portion of the left side surface of the base plate 2. A head cylinder 22 and a loading ring 23 are mounted on the base plate 2 below the cassette housing. Return guides 24 are rotatably mounted on the loading ring 23. A magnetic head (not shown) is rotatably mounted onto the periphery of the head cylinder 22. A magnetic tape is taken out of the cassette half 21 in the cassette housing, with the rotation of the loading ring 23. The magnetic tape taken out of the cassette half 21 is passed round the head cylinder 22 and a total width eraser head 28, and is led past an audio control head 27, a pinch roller 25 and capstan 26, as in the usual VTR. A capstan drive motor for rotating the capstan 26 to drive the tape and a head drive motor for rotating the magnetic head provided on the head cylinder 22 (these motors not being shown), are mounted on a right hand portion of the base plate 2. The VTR signal from the image sensor 14 is fed to the magnetic head of the head cylinder 22 in such a way that it is recorded on the magnetic tape.

A grip 30 for supporting the video camera is secured to the underside of the base plate 4. This grip 30 is secured to that portion of the base plate 4 where base plates 2 and 3 cross each other. This position is made to substantially coincide with the centroid of the video camera. This is done because it is desirable, from the standpoint of handling the video camera, to mount the grip at a position corresponding to or slightly forward of the centroid. A power supply unit 31 such as a battery or a DC/DC converter is accommodated within the grip 30. A manual button 32 for operating the video camera is provided on the top front of the grip 30. While the manual button 32 is in a depressed position, the VTR 20 is operative with power furnished from the power supply unit 31, so that the televised data may be recorded. The grip 30 is secured to the underside of the base plate 4 and projects downwards from the video camera housing. Alternatively, the grip 30 may be mounted foldably or removably on the base plate 4.

In the video camera described above, the support structure, which consists of the three perpendicular base plates 2 to 4, supports the camera section 8 and VTR 20. The three base plates 2 to 4 mutually reinforce their mechanical strengths. Thus, they may be made from thin plates. If it is intended that the camera section 8 and VTR 20 should be secured to the housing, the housing must have a large thickness to ensure sufficient mechanical strength to hold the camera section and VTR in position. Therefore, the weight of the video camera would be increased. By way of contrast; with provision of the support structure 1, the main role of the housing is substantially to only protect the accommodated components from external shock. The housing wall may thus have only a slight thickness, even if the viewfinder and its lens system 18 are mounted on the housing. The use of the support structure 1 thus permits great reduction of the weight of the video camera with VTR.

More specifically, with the support structure 1 consisting of the three base plates 2 to 4 mutually reinforcing the mechanical strength thereof, great thickness may be provided only for small areas where high mechanical strength is needed, for instance at the edge portions of the base plate 2 in contact with base plates 3 and 4, while the thickness may be slight where high mechanical strength is unnecessary. Thus, the weight of the video camera can be reduced. On the other hand, with a frame-like structure such as the housing, the thickness cannot be locally reduced. Therefore, when the VTR is secured to a housing with a uniform wall thickness, the weight of the video camera is considerably increased.

The base plates 2 to 4 respectively support the VTR 20, the VTR 20 and camera section 8 and the entire video camera. Considering that the lens system 9 has a weight of 250 to 800 g and the VTR 20 has a weight of about 650 g, the thicknesses $t_2$, $t_3$ and $t_4$ of the respective base plates 2 to 4 are preferably set in such a way as to constitute the following relationship:

$$t_2 < t_3 < t_4$$

These thicknesses may be reduced by providing a rib structure for portions where high mechanical strength is required.

The height $H_2$ of the base plate 2 is determined by the size of the supported VTR 20. The width $W_3$ of the base plate 3 is determined by the size and mounting position of the camera section 8. The width $W_4$ of the base plate 4 is determined by the mounting position of the grip 30 and, also, by whether the grip 30 is secured or removably mounted. Considering the size of the VTR 20 and camera section 8, the dimensions $H_2$, $W_3$ and $W_4$ are usually set in such a way as to constitute the following relationship:

$$W_3 \leq W_4 < H_2$$

The base plates 2 to 4 are individually formed with their respective wiring holes and air vent holes. They may also be formed with other holes or openings in portions where high mechanical strength is unnecessary. By so doing, the weight of the support structure 1 can be further reduced.

The base plates 2 to 4 are preferably made of a material which is light in weight and nevertheless provides sufficient mechanical strength. Examples of such a material are such metals as aluminum and magnesium, as well as glass-reinforced plastics. These materials have good moldability, so that the support structure 1 consisting of base plates 2 to 4 may be molded as a one-piece molding. By molding the support structure 1, the manufacturing process can be simplified and the mechanical strength of the support structure 1 can be further improved as well. Aluminum can provide a comparatively high degree of mechanical strength, so that the thickness of base plates 2 to 4 may be reduced. The use of magnesium would permit greater weight reduction than the use of aluminum. However, since magnesium is readily rusted, it is best not to use this material for exposed portions. Glass-reinforced plastic material permits improvement of the molding precision of the support structure 1. In addition, since the molding can be done under uniform conditions, the dimensional precision of the molding shape can be enhanced. The subsequent machining operation can thus be largely dispensed with and the support structure 1 can be further reduced in weight and fabricated at a reduced cost. With metallic materials, a machining operation will be required after the molding process. In this case, since the support structure 1 consists of three integral base plates which are perpendicular to one another, various surfaces of the structure can be machined with the structure held chucked in the same position and the machining cost can thus be reduced.

Further, since the VTR 20 is mounted on the base plate 2 which is centrally located with reference to the housing, it is possible to reduce useless space in the housing area and, thus, to reduce the size of the video camera. Further, the VTR can be mounted on the central base plate 2 more readily than on the inner wall of the housing. In this case, the housing would ideally consist of left and right halves joined together in a plane lying in the central base plate 2. With this arrangement, components mounted on either side of the base plate 2 can be repaired by removing only the corresponding housing half.

Figure 2:
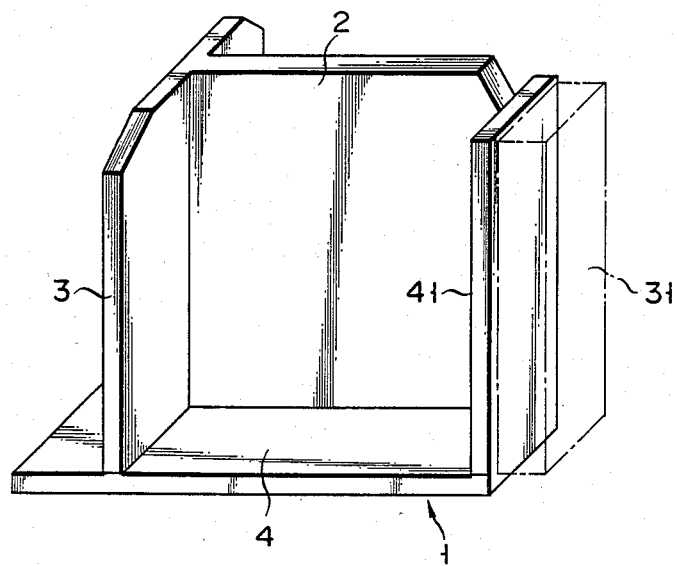
FIGS. 2 and 3 are perspective views showing respective modifications of a support structure.
Figure 3:
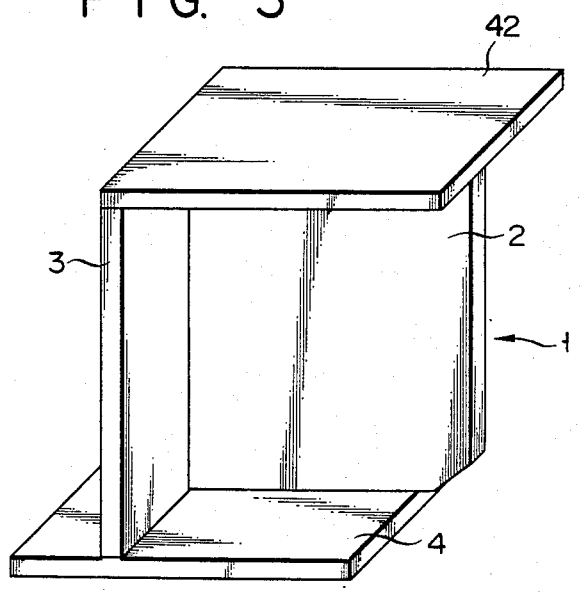

FIGS. 2 and 3 show respective modifications of the support structure 1. The support structure 1 shown in FIG. 2 includes a further base plate 41, which is secured to the rear edge of base plates 2 and 4 and extends in parallel with base plate 3. The power supply unit 31 may be mounted on the base plate 41. The support structure 1 shown in FIG. 3 includes a further base plate 42, which is secured to the top edge of base plates 2 and 3 and extends in parallel to the base plate 4. The lens system 18 (see FIG. 1) for the viewfinder may be mounted on base plate 42. Base plates 41 and 42 may of course be provided merely as reinforcing plates for reinforcing the structure consisting of base plates 2 to 4.

While the above embodiment is concerned with the video camera having VTR, this is by no means a limiting factor, since the invention is broadly applicable to any camera with a magnetic recorder which comprises an image pickup optical system and a magnetic recorder section assembled in the camera section, e.g., an electronic camera.

What we claim is:

1. A camera with an integral magnetic recorder for recording images of objects on a magnetic recording medium, comprising:

a support structure comprising first, second and third base plates, said first and second base plates being secured to one surface of said third base plate and extending substantially at right angles thereto, and said first base plate being secured to one surface of said second base plate and extending substantially at right angles thereto and positioned between those ends of said third base plate which oppose along a line perpendicular to said first base plate;

an image pickup optical system provided to said second base plate for converting the images of objects into electrical signals;

recording means provided to said first base plate for recording said electrical signals on the magnetic recording medium; and a grip member provided to said third base plate which is to be gripped for supporting said camera.

2. The camera with an integral magnetic recorder according to claim 1, wherein said first base plate is secured to a substantially central portion of said third base plate in the widthwise direction thereof.

3. The camera with an integral magnetic recorder according to claim 1, wherein said second base plate has a lens system support secured to the surface of said second base plate to which said first base plate is not secured, with said image pickup optical system being mounted on said lens system support.

4. The camera with an integral magnetic recorder according to claim 3, wherein said lens system support has a mount supporting said image pickup optical system and a plurality of bars connecting said mount to said second base plate, so as to space said mount at a suitable distance from said second base plate.

5. The camera with an integral magnetic recorder according to claim 4, wherein said image pickup optical system includes an image sensor mounted on said mount, on the side thereof connected to said second base plate for converting light into an electrical signal, and a lens system mounted on said mount, on the side thereof which is opposite to said second base plate, for leading light to said image sensor.

6. The camera with an integral magnetic recorder according to claim 1, wherein said grip member is secured to said third base plate on the side thereof opposite to said first and second base plates.

7. The camera with an integral magnetic recorder according to claim 1, wherein said support structure further has a fourth base plate secured to an edge of said first base plate and third base plate and extending substantially in parallel to said second base plate, with a power supply unit being mounted on said fourth base plate.

8. The camera with an integral magnetic recorder according to claim 1, wherein said support structure further has a fourth base plate secured to an edge of said first base plate and second base plate and extending substantially in parallel to said third base plate, and has a lens system for a viewfinder which is mounted on said fourth base plate.

* * * * *